(12) United States Patent
Elmegreen et al.

(10) Patent No.: US 10,564,175 B2
(45) Date of Patent: Feb. 18, 2020

(54) ACCELEROMETER USING DIMAGNETIC LEVITATION

(71) Applicant: INTERNATIONAL BUSINESS MACHINES CORPORATION, Armonk, NY (US)

(72) Inventors: Bruce G. Elmegreen, Goldens Bridge, NY (US); Oki Gunawan, Yorktown Heights, NY (US); Theodore van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 15/825,708

(22) Filed: Nov. 29, 2017

(65) Prior Publication Data

US 2019/0162751 A1    May 30, 2019

(51) Int. Cl.
*G01P 15/105* (2006.01)
*G01P 15/18* (2013.01)
(Continued)

(52) U.S. Cl.
CPC ........ *G01P 15/105* (2013.01); *G01P 15/0802* (2013.01); *G01P 15/18* (2013.01); *G01P 15/093* (2013.01); *G01P 15/125* (2013.01)

(58) Field of Classification Search
None
See application file for complete search history.

(56) References Cited

U.S. PATENT DOCUMENTS 3,552,028 A  *  1/1971  Simon ...................... G01C 9/18
                                                    33/344
4,344,235 A  *  8/1982  Flanders .................. G01C 9/00
                                                    33/312
(Continued)

FOREIGN PATENT DOCUMENTS

| CN | 101216500 B | 6/2010 |
| CN | 103884867 B | 3/2016 |
| CN | 105738653 A | 7/2016 |

OTHER PUBLICATIONS

Gunawan et al., "A Parallel Dipole Line System", ResearchGate, Applied Physics Letter, Feb. 2015, pp. 1-24.
(Continued)

*Primary Examiner* — Paul M. West
*Assistant Examiner* — Mark A Shabman
(74) *Attorney, Agent, or Firm* — L. Jeffrey Kelly

(57) ABSTRACT

An accelerometer without internal mechanical attachments. Three parallel cylindrical magnets are fixed within a housing. Each cylindrical magnet has a long axis extending through the housing and a cylindrical cross-section. The cylindrical cross-sections of the cylindrical magnets are organized to form a triangular formation. The magnetization of the cylindrical magnets is tangential to the triangular formation. A diamagnetic mass object levitates within the three cylindrical magnets by the magnetization of the cylindrical magnets at an equilibrium position near the center of the triangular formation and near a central axis of the three parallel cylindrical magnets when no external force is applied. Sensors detect the location of the diamagnetic mass object when the diamagnetic mass object is displaced from the equilibrium position near the center of the triangular formation and the three parallel cylindrical magnets by an external force to the housing.

20 Claims, 7 Drawing Sheets

(51) Int. Cl.
  *G01P 15/08* (2006.01)
  *G01P 15/093* (2006.01)
  *G01P 15/125* (2006.01)

(56) References Cited

U.S. PATENT DOCUMENTS

| | | | |
|---|---|---|---|
| 5,012,669 A * | 5/1991 | Meyer | G01N 27/74 |
| | | | 324/204 |
| 5,396,136 A | 3/1995 | Pelrine | |
| 7,134,342 B1 | 11/2006 | Mueller et al. | |
| 7,252,001 B2 | 8/2007 | Boletis et al. | |
| 7,597,002 B2 | 10/2009 | Moser et al. | |
| 7,816,643 B2 | 10/2010 | Hyodo | |
| 7,889,037 B2 | 2/2011 | Cho | |
| 7,978,334 B2 * | 7/2011 | Schwartz | G01C 19/58 |
| | | | 356/460 |
| 8,109,142 B2 | 2/2012 | Bratkovski et al. | |
| 8,895,355 B2 * | 11/2014 | Cao | H01L 21/02697 |
| | | | 257/E21.024 |
| 9,086,429 B1 | 7/2015 | Biedermann et al. | |
| 9,093,377 B2 | 7/2015 | Cao et al. | |
| 9,153,114 B2 | 10/2015 | Yi et al. | |
| 9,236,293 B2 * | 1/2016 | Cao | H01L 21/283 |
| 9,263,669 B2 | 2/2016 | Cao et al. | |
| 9,299,925 B2 | 3/2016 | Yi et al. | |
| 9,568,316 B2 | 2/2017 | Johnson et al. | |
| 10,234,286 B2 * | 3/2019 | Gunawan | G01C 9/06 |
| 2006/0162452 A1 * | 7/2006 | Moser | F16C 32/0436 |
| | | | 73/514.16 |
| 2013/0152680 A1 | 6/2013 | Sackett et al. | |
| 2017/0299410 A1 * | 10/2017 | Gunawan | G01D 5/24 |
| 2017/0301445 A1 * | 10/2017 | Gunawan | H01F 7/0236 |
| 2018/0031716 A1 * | 2/2018 | Gunawan | G01V 1/001 |
| 2019/0162751 A1 * | 5/2019 | Elmegreen | G01P 15/105 |

OTHER PUBLICATIONS

Gunawan et al., "The One-Dimensional Camelback Potential in the Parallel Dipole Line Trap: Stability Conditions and Finite Size Effect", Journal of Applied Physics 121, 133902 (2017); https://doi.org/10.1063/1.4978876, pp. 1-5.

Gunawan et al., "A New Effect in Electromagnetism Discovered—150 Years Later", IBM Research, Oct. 20, 2017, https://www.ibm.com/blogs/research/2017/10/new-effect-electromagnetism/, pp. 1-2.

\* cited by examiner

ACCELEROMETER USING DIMAGNETIC LEVITATION

BACKGROUND

The present invention relates generally to the field of accelerometers, and more particularly to three-dimensional accelerometers using magnets.

BRIEF SUMMARY

Embodiments of the present invention disclose an accelerometer without internal mechanical attachments. Three parallel cylindrical magnets are fixed within a housing. Each cylindrical magnet has a long axis extending though the housing and a cylindrical cross-section. The cylindrical cross-sections of the cylindrical magnets are organized to form a triangular formation. The magnetization of the cylindrical magnets is tangential to the triangular formation. A diamagnetic mass object levitates within the three cylindrical magnets by the magnetization of the cylindrical magnets at an equilibrium position near the center of the triangular formation and near a central axis of the three parallel cylindrical magnets when no external force is applied. Sensors detect the location of the diamagnetic mass object when the diamagnetic mass object is displaced from the equilibrium position near the center of the triangular formation and the three parallel cylindrical magnets by an external force to the housing.

BRIEF DESCRIPTION OF THE DRAWINGS

These and other features, aspects, and advantages of the present invention will become better understood with regard to the following detailed description and accompanying drawings where.

DETAILED DESCRIPTION

Accelerometers are commonly used in navigation systems, vibration and mechanical noise detection, orientation and position sensing of electronic and medical devices, drone flight stabilization, and other applications. Current accelerometers utilize cantilevers with piezoelectric or capacitance detection of position. A mass object in each cantilever resists motion when the housing around it accelerates, and the relative position of the mass object and the housing is then detected. Since the mass object is connected to the housing by one or more cantilevers, current accelerometers cannot detect motion in the direction of the connection with the cantilever, and are therefore not fully three-dimensional, i.e. free to sense acceleration in all directions. An application involving acceleration detection in three dimensions therefore requires more than one accelerometer, each with sensitivities in different directions to be fully able to sense acceleration in three-dimensions. Presented is an accelerometer which functions accurately in all three dimensions via utilization of a diamagnetic mass object levitating within three parallel cylindrical magnets within a housing, the diamagnetic mass object having no mechanical attachments to the housing.

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will convey the scope of this disclosure to those skilled in the art. In the description, details of well-known features and techniques may be omitted to avoid unnecessarily obscuring the present embodiments.

In the interest of not obscuring the presentation of embodiments of the present invention, in the following detailed description, some processing steps or operations that are known in the art may have been combined together for presentation and for illustration purposes and in some instances may not have been described in detail. In other instances, some processing steps or operations that are known in the art may not be described at all. It should be understood that the following description is focused on the distinctive features or elements of various embodiments of the present invention.

Figure 1:
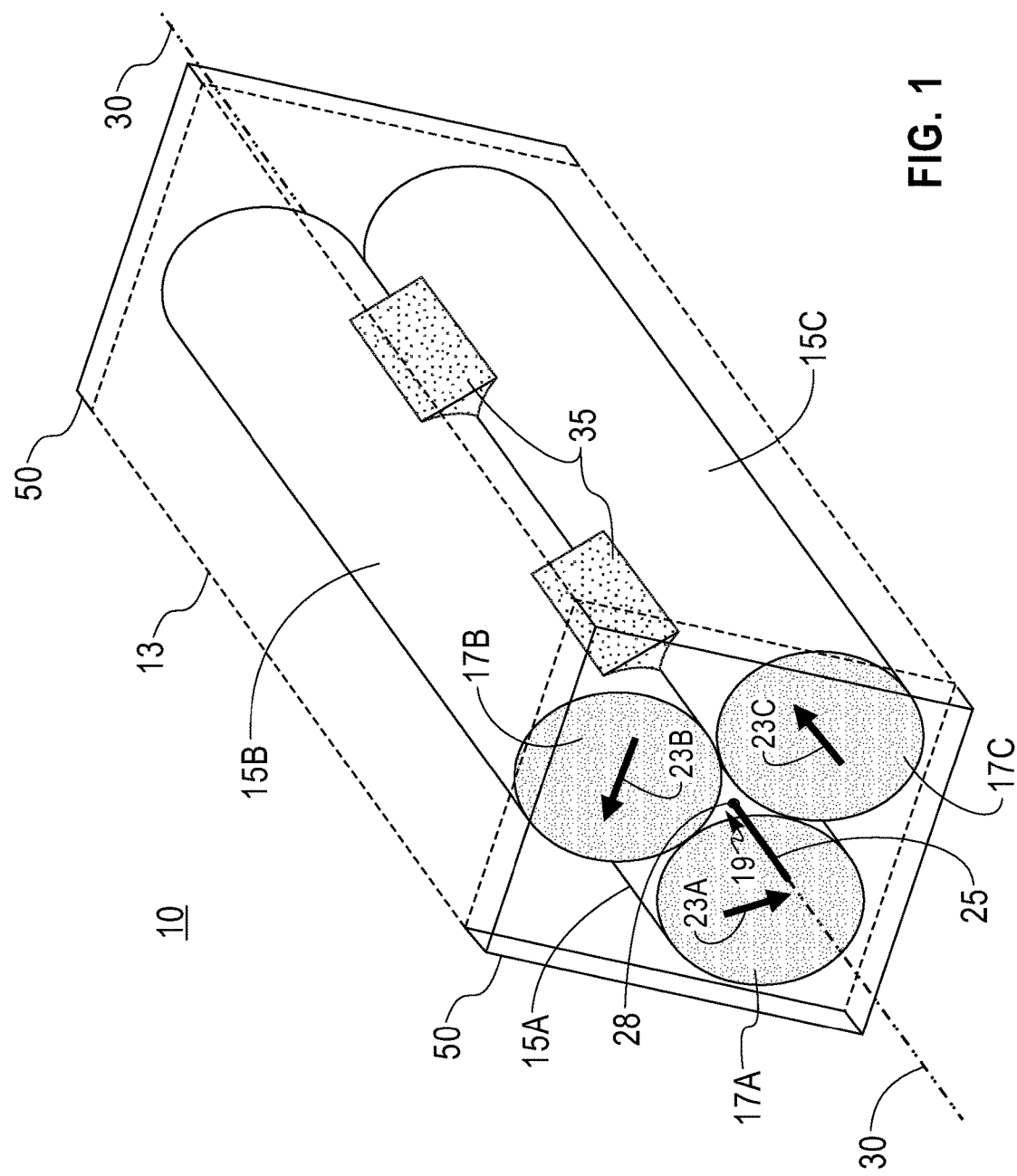
FIG. 1 is a perspective view of a representative accelerometer embodying characteristics of the present invention.
Figure 2:
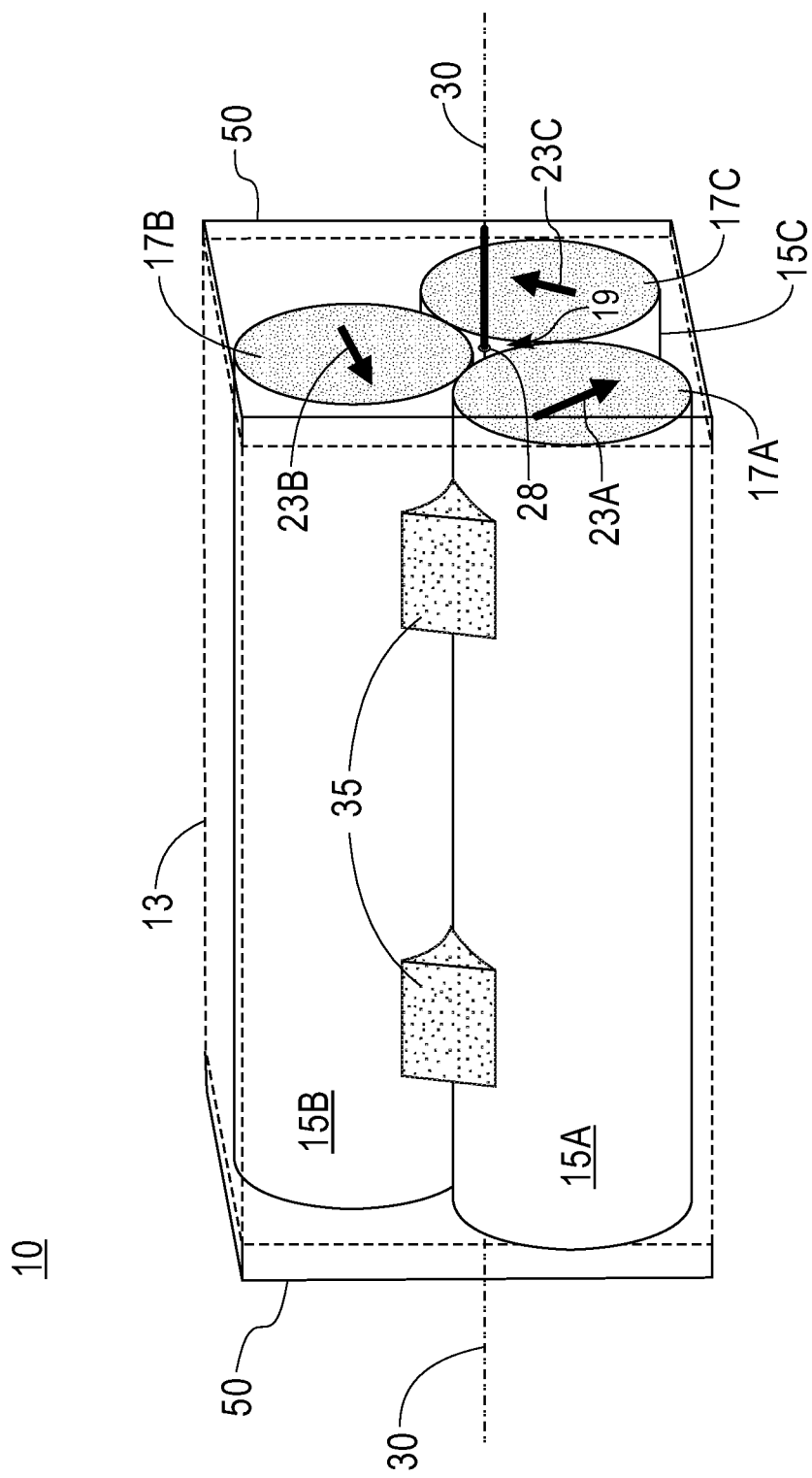
FIG. 2 is a side elevational view of the accelerometer illustrated in FIG. 1 embodying characteristics of the present invention.
Figure 3:
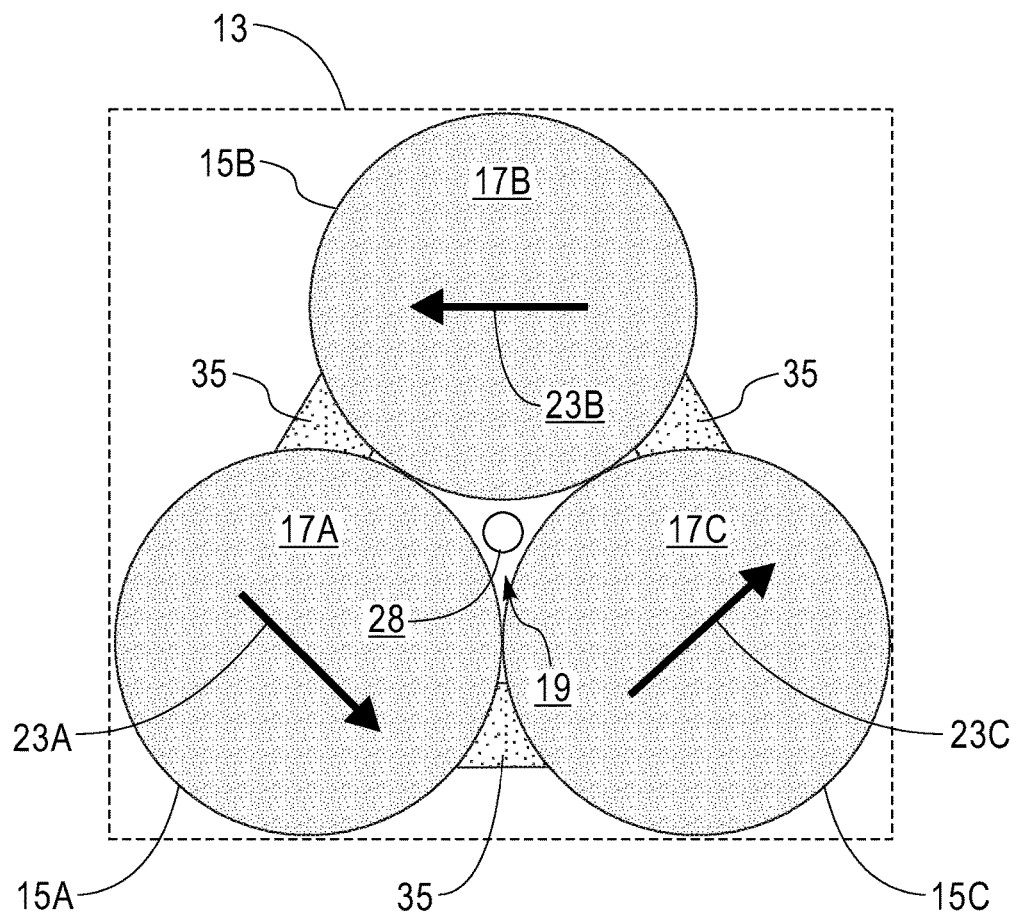
FIG. 3 is a cross-sectional view of a representative accelerometer embodying characteristics of the present invention.

Referring now to the drawings for a better understanding of the present invention, a representative accelerometer without internal mechanical attachments is displayed in FIG. 1 et seq. by reference numeral 10. As displayed in FIG. 1 et seq., reference numeral 10 is an accelerometer containing three parallel cylindrical magnets 15A, 15B, and 15C and other features as discussed. A housing 13 fixes the three parallel cylindrical magnets 15A, 15B, 15C within the housing 13 and with reference to each other. In the preferred embodiment, each cylindrical magnet 15A, 15B, 15C has a long axis extending through the housing 13, terminating at each end of the housing 13 in cylindrical cross-sections 17A, 17B, and 17C. The three cylindrical cross-sections 17A, 17B, 17C form a triangular formation 19 at diametrically opposed ends of the housing 13.

The cylindrical magnets 15A, 15B, 15C may be composed of any strong permanent magnets such as neodymium alloy, alnico magnet alloy, rare earth magnetic materials, samarium cobalt, or any ceramic material. The three cylindrical magnets 15A, 15B, 15C may alternatively be electromagnets or superconducting magnets. The magnetic field may be concentrated and the magnetic field strength enhanced within the cylindrical magnets 15A, 15B, 15C using a high-permeability alloy such as an iron-nickel alloy such as Permalloy.

Three parallel cylindrical magnets 15A, 15B, 15C are displayed in FIG. 1 et seq., but the cylindrical magnets 15A, 15B, 15C may take any physical shape in the accelerometer 10 which generates a sufficiently strong magnetic field for uses such as described below, such as substantially cylindrical shapes with a modified inner surface (as further discussed below), ovoid shapes, Yin-Yang shapes, or cubic shapes. More than three parallel cylindrical magnets 15A, 15C, 15C may also be utilized in alternative embodiments, and instead the number of magnets utilized in the accelerometer 10 may number five, seven, or any other.

The three cylindrical magnets 15A, 15B, and 15C are equally-spaced and in close proximity to each other (or touching) to maintain a sufficiently strong magnetic field to levitate a diamagnetic mass object 25 at an equilibrium position along or near a central axis 30 of the three cylindrical magnets 15A, 15B, 15C and, at the ends of the housing, in or near the center 28 of the triangular formation 19. Diamagnetism causes the diamagnetic mass object 25 to generate an internal magnetic moment in the presence an external magnetic field, such as generated by the three cylindrical magnets 15A, 15B, 15C. The magnetic field generated by the three cylindrical magnets 15A, 15B, 15C has a local minimum in strength along the central axis 30 of the three cylindrical magnets 15A, 15B, 15C, and without external disturbance, the diamagnetic mass object 25 levitates at the equilibrium position along or slightly below the central axis 30 of the cylindrical magnets 15A, 15B, 15C. Since the diamagnetic mass object 25 is affected by gravity, the equilibrium position is very slightly off of the central axis 30 in a direction of the force of gravity, and the equilibrium position is defined by this position. The equilibrium point may change slightly based upon the orientation in three dimensions of the accelerometer 10. The equilibrium position of the diamagnetic mass object 25 is taken account of by the presently disclosed invention, as further discussed herein.

The diamagnetic mass object 25 is a thin, substantially cylindrical object composed of a material having strong diamagnetic properties while still having a low mass density, such as pyrolytic carbon, bismuth, silver, graphite, or a similar material, allowing the diamagnetic mass object 25 to have sufficient diamagnetic properties to repel away from the cylindrical magnets 15A, 15B, 15C, and be light enough to levitate within the magnetic field generated by the three cylindrical magnets 15A, 15B, 15C and not dragged downward by gravity. The diamagnetic mass object 25 thus remains suspended at the equilibrium point along or near the central axis 30 of the cylindrical magnets 15A, 15B, 15C when no external disturbance occurs to the accelerometer 10. In the case where the accelerometer 10 is horizontally placed, so long as the force of repulsion in a vertical direction of the three cylindrical magnets 15A, 15B, 15C exceeds the sum of the weight of the diamagnetic mass object 25 and the downward force from the top magnet 15B, the diamagnetic object 25 remains levitating, and not touching any of the three cylindrical magnets.

Although a substantially cylindrical diamagnetic mass object 25 is displayed in FIG. 1 et seq., the diamagnetic object 25 is contemplated as being any shape optimized for levitation within the cylindrical magnets 15A, 15B, 15C. To minimize eddy currents within the diamagnetic mass object 25, which may lead to damping of motion of the diamagnetic mass object 25, the internal structure of the diamagnetic mass object 25 may be composed of small pieces of diamagnetic material such as described above embedded in a light-weight electrically insulating matrix.

As shown in FIG. 1 et seq., the magnetization of the cylindrical magnets 15A, 15B, 15C is tangential to the triangular formation 19, as displayed 23A, 23B, and 23C. A slight increase in the magnetization near the ends of the cylindrical magnets 15A, 15B and 15C serves to trap the diamagnetic mass object 25 inside the triangular formation 19. The tangential magnetizations 23A, 23B, 23C stably levitate the diamagnetic mass object 25 in the space between the cylindrical magnets 15A, 15B, 15C, as displayed in FIG. 1 et seq., unless an external force moves the housing 13 along with the fixed cylindrical magnets 15A, 15B, 15C within the housing 13.

In operation, when an external force moves the housing 13 and cylindrical magnets 15A, 15B, 15C within the housing 13, the diamagnetic mass object 25 displaces from its equilibrium position near the center of the triangular formation 28 and the central axis 30 of the three parallel cylindrical magnets 15A, 15B, 15C. Since the diamagnetic mass object 25 is levitating freely within the cylindrical magnets 15A, 15B, 15C without external attachment in any way, even a small motion of the housing 13 caused by an external disturbance results in motion of the diamagnetic mass object 25 away from its equilibrium position along or near the central axis 30 of the three cylindrical magnets 15A, 15B, 15C in a direction directly opposite the force from the external disturbance, as inertia from the mass of the diamagnetic mass object 25 causes the diamagnetic mass object 25 to resist motion in the absolute sense, and remain in the same place. Since the mass of the diamagnetic mass object 25 is known, and the magnitude of displacement measured by sensors 35, as further discussed, the acceleration of the housing 13 can be calculated from the apparent motion of the diamagnetic mass object 25 versus the three cylindrical magnets 15A, 15B, 15C.

The magnitude of the displacement of the diamagnetic mass object 25 is measured by sensors 35 which have no physical connection to the diamagnetic mass object 25, in order to avoid interfering with the magnetic and diamagnetic forces holding the diamagnetic mass object 25 in place at the equilibrium position when the accelerometer 10 is at rest. The equilibrium position may move slightly from the center of the triangular formation 19 and the central axis 25 based upon gravity and the orientation of the accelerometer 10, but calibration of the equilibrium position for gravity is anticipated by the presently disclosed invention. Sensors 35 detect magnitude of displacement of the diamagnetic mass object from the calibrated equilibrium position.

In the preferred embodiment, six sensors 35 are placed around the junctions of each cylindrical magnet 15A, 15B, 15C, but in alternative embodiments three, nine, twelve, fifteen, or more sensors 35 may be utilized by the accelerometer 10 in various embodiments. Sensors 35 may utilize light or capacitance in detecting the position of the diamagnetic mass object 25. After detecting the position of the diamagnetic mass object 25, sensors 35 may communicate information regarding the magnitude of the displacement of the diamagnetic mass object 25 externally via utilization of wires, radio waves (such as via wifi, cellular connections, etc), or otherwise. Electronics for communication of information regarding the magnitude of the displacement may be internal to the accelerometer 10 and peripheral to the cylindrical magnets 15A, 15B, 15C.

Figure 7:
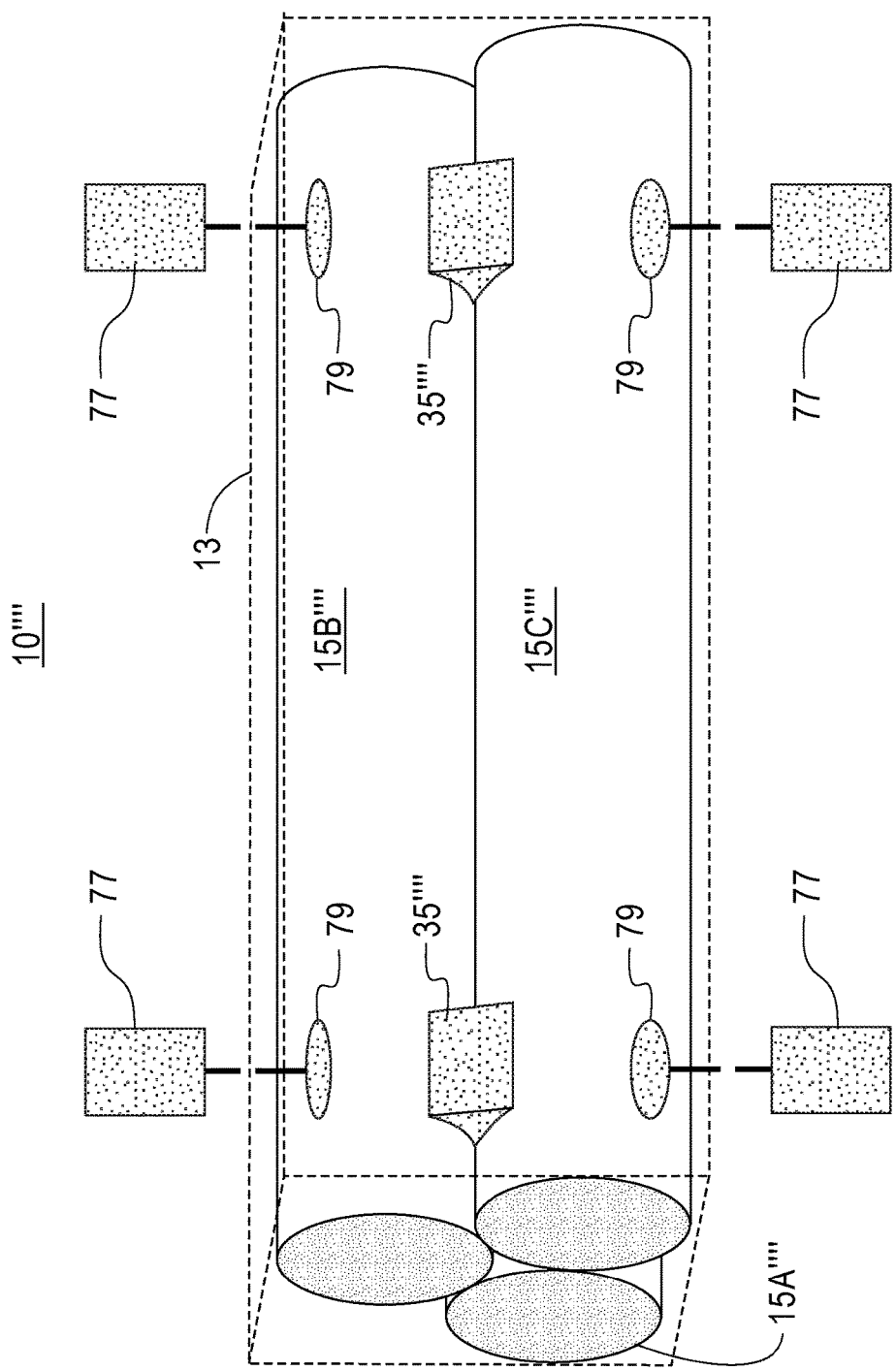
FIG. 7 is a side elevational view of an alternative embodiment of the accelerometer embodying characteristics of the present invention utilizing sensors which detect light from external light emitters to detect displacement experienced by the diamagnetic mass object.

If sensors 35 utilize light, light detectors in conjunction with light emitters may be utilized to determine the magnitude of the displacement of the diamagnetic mass object 25 from its equilibrium position near the central axis 30 of the three cylindrical magnets 15A, 15B, 15C and the center of the triangular formation 19 by passing light generated by the light emitters in between small slits between the cylindrical magnets 15A, 15B, 15C, or, alternatively, as further discussed in connection with FIG. 7. Light emitters may be light emitting diodes, standard lamps, florescent lights, or any other light source. Motion of the diamagnetic mass object 25 parallel to the long axes of the three cylindrical magnets 15A, 15B, 15C may be detected by an increase in light reception by all three detectors 35 at one end of the accelerometer 10 and a decrease in light reception by all three detectors at the opposing end of the accelerometer 10 (when detecting motion parallel to the long axes by detectors 35, ends of diamagnetic mass object 25 are at position of detectors 35). Transverse and tilting motions of the diamagnetic mass object 25 may be detected by an increase in light reception at one or two sensors 35 at either end of the accelerometer 10 and a decrease by the other one or two sensors 35 at the same end of the accelerometer 10.

If sensors 35 utilize capacitance to detect displacement of the diamagnetic mass object 25, each sensor 35 is used to measure the capacitance between the diamagnetic mass object 25 and the surfaces of the cylindrical magnets 15A, 15B, 15C. Capacitance measurement by sensors 35 requires the three cylindrical magnets 15A, 15B, 15C be electrically decoupled from each of the other cylindrical magnets 15A, 15B, 15C by leaving a space between them or by using an electrical insulator (such as rubber or plastic) between all connections between the three cylindrical magnets 15A, 15B, 15C. Sensors 35 to detect capacitance between the diamagnetic mass object 25 and the part of the cylindrical magnet 15A, 15B, 15C closest to the diamagnetic mass object 25, specifically utilize radio frequency oscillations to detect capacitance or detect capacitance in another manner. The displacement of the diamagnetic mass object 25 is thus detected.

The only resistance the diamagnetic mass object 25 experiences when displaced from its equilibrium near the center of the triangular formation 28 and the central axis 30 of the three parallel cylindrical magnets 15A, 15B, 15C is viscous drag from any liquids or gases which may be contained in between the cylindrical magnets 15A, 15B, 15C. This may be altered in various embodiments to obtain whatever damping is desired for relative motion of the diamagnetic mass object 25. Thus the accelerometer 10 may be tuned to be especially sensitive to a particular frequency of vibration if the damping created by the liquid or gas selected is inverse to the frequency of vibration sought (such as, for example, if the accelerometer 10 is utilized to detect a certain motion indicating a step taken while walking, in applications involving pedometers).

In the preferred embodiment, the housing 13 extends partially around the cylindrical magnets 15A, 15B, 15C, while leaving two open ends diametrically opposed from one another in the vicinity of the triangular formation 19. The housing 13 is composed from a material such as non-magnetic metal, plastic, or rubber. The magnetic field generated by the three cylindrical magnets 15A, 15B, 15C may keep the diamagnetic mass object 25 from falling out of the housing when external forces are low, but if a substantial external force is applied to the housing 13, to prevent the diamagnetic mass object 25 from falling out of the housing 13 two covers 50 are secured over the open ends to restrain the diamagnetic mass object 25. The two covers 50 may be formed from clear plastic, glass, or another transparent material to allow a sensor 35 to detect displacement of the diamagnetic mass object 25 or an external observer to view the diamagnetic mass object 25 externally. The housing 13 and covers 50 may be used to contain a gas or liquid for damping of motion of the diamagnetic mass object 25.

Figure 4:
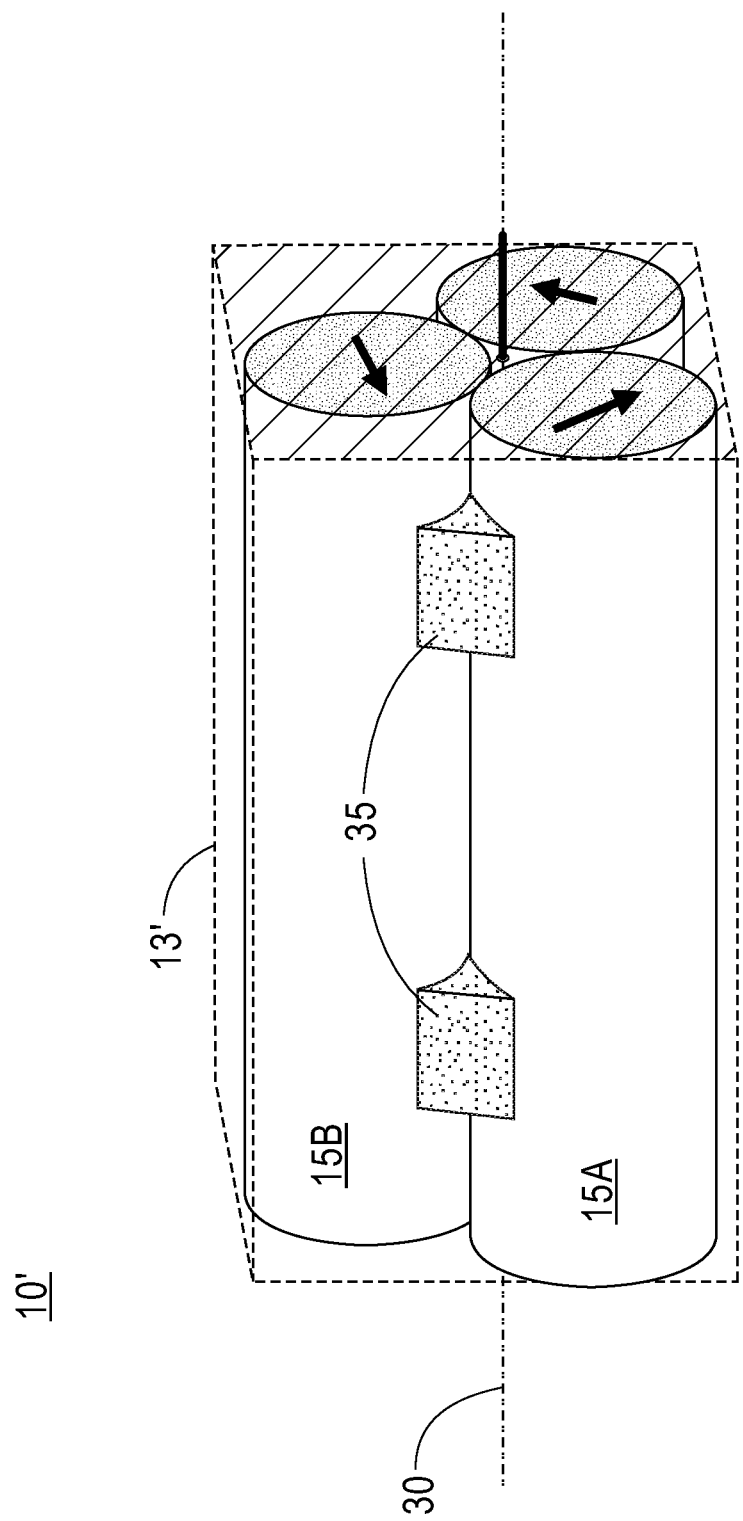
FIG. 4 is a side elevational view of an alternative embodiment of the accelerometer having a housing extending completely around cylindrical magnets embodying characteristics of the present invention.

FIG. 4 shows an alternative embodiment of the present invention designated generally as 10'. Accelerometer 10' is substantially the same as accelerometer 10, with the exception that the housing 13' extends completely around the cylindrical magnets 15A, 15B, 15C. The housing 13' secures both ends of the diamagnetic mass object 25 from movement out of the housing 13' in a direction along the central axis 30, securing the diamagnetic mass object 25 from falling out by a substantial external force to the housing 13.

Figure 5:
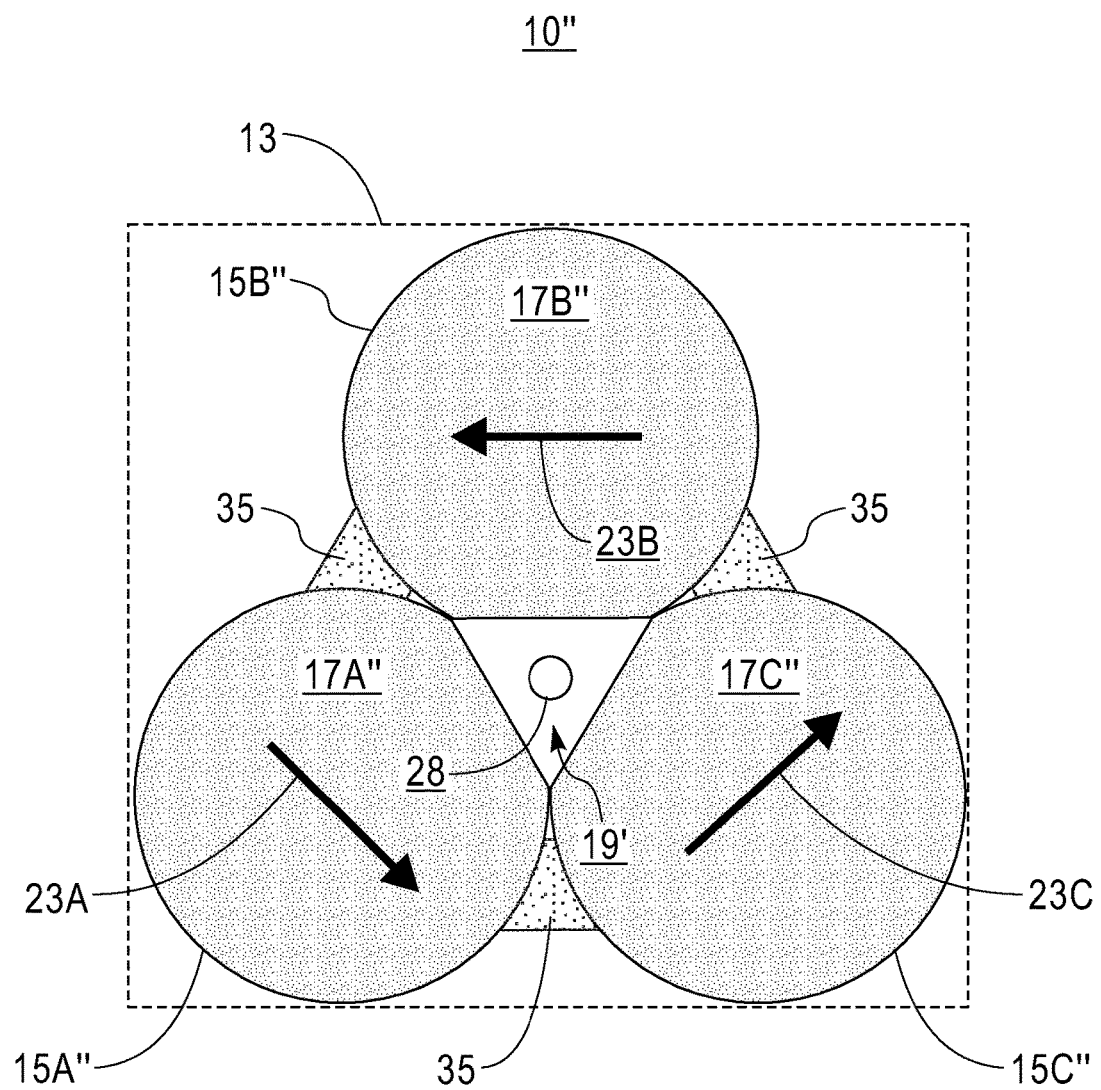
FIG. 5 is a cross-sectional view of an alternative embodiment of the accelerometer with substantially cylindrical magnets each having a cutout embodying characteristics of the present invention.

FIG. 5 shows an alternative embodiment of the present invention designated generally as 10". Accelerometer 10" is substantially the same as accelerometer 10 with the exception that the cylindrical magnets 15A, 15B, 15C are replaced with substantially cylindrical magnets 15A", 15B", 15C" terminating at each end of the housing 13 in substantially cylindrical cross-sections 17A", 17B", and 17C". The substantially cylindrical magnets 15A", 15B", 15C" each have a cutout. The three cutouts form a larger equilateral triangular formation 19". The larger equilateral triangular formation 19" provides more space for the diamagnetic mass object 25, allowing the diamagnetic mass object 25 to move greater distances in response to acceleration in three dimensions, or allows a larger diamagnetic mass object 25 to be used.

Figure 6:
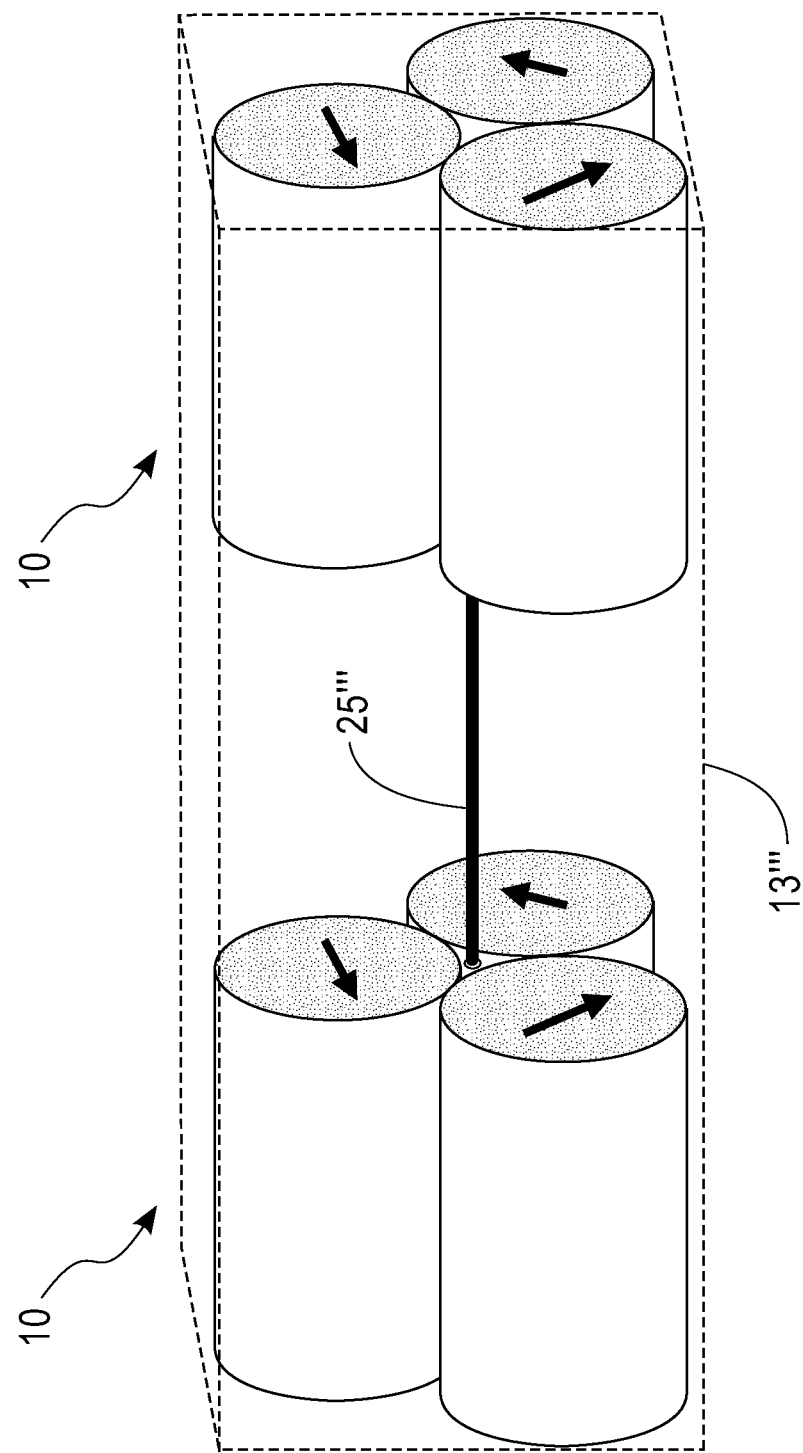
FIG. 6 is a side elevational view of an alternative embodiment where two accelerometers are placed side by side and a larger diamagnetic mass object is placed between the two accelerometers embodying characteristics of the present invention.

FIG. 6 shows an alternative embodiment where two accelerometers 10 are placed side by side with empty space between them within a longer housing 13''', and a longer diamagnetic mass object 25''' is placed between the two accelerometers 10 to detect displacement of the larger diamagnetic mass object 25''. The elements of each of the two accelerometers 10 are substantially the same as accelerometer 10 described except the longer diamagnetic mass object 25''' extends from a first end of the first accelerometer 10 through the empty space, to a second end of the second accelerometer 10. The longer diamagnetic mass 25''' allows for a greater degree of precision in detection of acceleration in three dimensions experienced by the accelerometers 10.

FIG. 7 show an alternative embodiment of the present invention designated generally as 10''''. Accelerometer 10'''' is substantially the same as accelerometer 10 with the exception that external light emitters 77 are utilized in conjunction with light sensors 35'''' to detect displacement of the diamagnetic mass object 25 in response to three dimensional acceleration. Light generated by the external light emitters 77 shines through holes 79 in cylindrical magnets 15A'''', 15B'''', and 15C'''', and is detected by light sensors 35'''' as the diamagnetic mass object 25 moves in response to various external forces. External light emitters 77 may be any of light emitting diodes, standard lamps, florescent lights, or any other light source.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:
1. An accelerometer without internal mechanical attachments, the accelerometer comprising:
   a housing;
   three parallel cylindrical magnets fixed within the housing, each cylindrical magnet having a long axis extending through the housing and a cylindrical cross-section, the cylindrical cross-sections of the cylindrical magnets organized to form a triangular formation, the magnetization of the cylindrical magnets tangential to the triangular formation;

a diamagnetic mass object, the diamagnetic mass levitating within the three cylindrical magnets by the magnetization of the cylindrical magnets at an equilibrium position near the center of the triangular formation and near a central axis of the three parallel cylindrical magnets when no external force is applied; and sensors for detecting the location of the diamagnetic mass object when the diamagnetic mass object is displaced from the equilibrium position near the center of the triangular formation and the three parallel cylindrical magnets by an external force to the housing.

2. The accelerometer of claim 1, wherein the at least three cylindrical magnets are exactly cylindrical in shape and the cylindrical cross-sections of the cylindrical magnets are exactly circular in shape.

3. The accelerometer of claim 1, wherein the sensors for detecting the location of the diamagnetic mass object when the diamagnetic mass object is displaced from the equilibrium position utilize light emitters and shadow sensors or differential capacitance between the diamagnetic mass object and the cylindrical magnets.

4. The accelerometer of claim 3, wherein the light emitters are selectively one of light emitting diodes, standard lamps, and florescent lights.

5. The accelerometer of claim 3, wherein the sensors for detecting the location of the diamagnetic object when the diamagnetic object is displaced from equilibrium position utilize differential capacitance between the diamagnetic mass object and a nearest surface of the cylindrical magnets.

6. The accelerometer of claim 1, wherein the sensors for detecting the location of the diamagnetic mass object utilize light generated by external light emitters shining through holes in the three parallel cylindrical magnets onto the diamagnetic mass object and light sensors are utilized to detect the light generated by the external light emitters.

7. The accelerometer of claim 1, wherein the diamagnetic mass object is comprised of selectively one of the following: pyrolytic carbon, bismuth, silver, and graphite.

8. The accelerometer of claim 1, wherein motion of the diamagnetic mass object is dampened by a liquid or gas contained in between the cylindrical magnets.

9. The accelerometer of claim 1, wherein the housing extends partially around the three parallel cylindrical magnets and has two open ends diametrically opposed from one another in the vicinity of the triangular formation.

10. The accelerometer of claim 9, wherein the housing has two covers secured over the two open ends, the covers restraining the diamagnetic mass object from movement out of the housing in a direction along the central axis.

11. The accelerometer of claim 10, wherein the two covers are composed of transparent plastic or glass.

12. The accelerometer of claim 11, wherein the housing is made from plastic or non-magnetic metal.

13. The accelerometer of claim 1, wherein the housing extends completely around the three parallel cylindrical magnets and secures both ends of the diamagnetic mass object from movement out of the housing in a direction along the central axis.

14. An accelerometer without internal mechanical attachments, the accelerometer comprising:

a housing;

three parallel substantially cylindrical magnets fixed within the housing, each substantially cylindrical magnet having a long axis extending through the housing and a cylindrical cross-section, the cylindrical cross-sections of the cylindrical magnets organized to form an equilateral triangle formation, the magnetization of the cylindrical magnets tangential to the equilateral triangle formation;

a diamagnetic mass object, the diamagnetic mass levitating within the three parallel substantially cylindrical magnets by the magnetization of the substantially cylindrical magnets at an equilibrium position near the center of the equilateral triangle formation and near a central axis of the three parallel substantially cylindrical magnets when no external force is applied; and sensors for detecting the location of the diamagnetic mass object when the diamagnetic mass object is displaced from the equilibrium position near the center of the equilateral triangle formation and the three parallel substantially cylindrical magnets by an external force to the housing.

15. The accelerometer of claim 14, wherein the sensors for detecting the location of the diamagnetic mass object when the diamagnetic mass object is displaced from the equilibrium position utilize light emitters and shadow sensors or differential capacitance between the diamagnetic mass object and the three parallel substantially cylindrical magnets.

16. The accelerometer of claim 14, wherein the diamagnetic mass object is comprised of selectively one of the following: pyrolytic carbon, bismuth, silver, and graphite.

17. The accelerometer of claim 14, wherein the housing extends partially around the three parallel cylindrical magnets and has two open ends diametrically opposed from one another in the vicinity of the triangular formation.

18. The accelerometer of claim 17, wherein the housing has two covers secured over the two open ends, the covers restraining the diamagnetic mass object from movement out of the housing in a direction along the central axis.

19. The accelerometer of claim 18, wherein the two covers are composed of transparent plastic or glass.

20. The accelerometer of claim 14, wherein the housing is made from plastic or non-magnetic metal.

* * * * *